(12) United States Patent
Chen

(10) Patent No.: US 11,157,386 B2
(45) Date of Patent: Oct. 26, 2021

(54) DEBUGGING RULES BASED ON EXECUTION EVENTS STORED IN AN EVENT LOG

(71) Applicant: SAP SE, Walldorf (DE)

(72) Inventor: Wei Chen, Shanghai (CN)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 16/224,581

(22) Filed: Dec. 18, 2018

(65) Prior Publication Data

US 2020/0192785 A1 Jun. 18, 2020

(51) Int. Cl.
G06F 11/36 (2006.01)
G06F 16/17 (2019.01)
G06F 8/41 (2018.01)

(52) U.S. Cl.
CPC .......... G06F 11/3636 (2013.01); G06F 8/427 (2013.01); G06F 16/1734 (2019.01)

(58) Field of Classification Search
CPC ....... G06F 11/36–3636; G06F 16/1734; G06F 8/427
See application file for complete search history.

(56) References Cited

U.S. PATENT DOCUMENTS

| | | | | |
|---|---|---|---|---|
| 6,836,766 | B1* | 12/2004 | Gilpin | G06Q 10/06 706/1 |
| 9,235,493 | B2* | 1/2016 | Goetsch | G06F 11/3604 |
| 9,734,040 | B2* | 8/2017 | Gounares | G06F 11/3636 |
| 2005/0081192 | A1* | 4/2005 | DeLine | G06F 11/3604 717/126 |
| 2014/0282373 | A1* | 9/2014 | Garza | G06F 8/51 717/106 |
| 2017/0109933 | A1* | 4/2017 | Voorhees | G06T 19/00 |
| 2020/0019494 | A1* | 1/2020 | Kwon | G06F 16/2246 |

OTHER PUBLICATIONS

Demaille et al., "TWEAST: A Simple and Effective Technique to Implement ConcreteSyntax AST Rewriting Using Partial Parsing", published by ACM, SAC'09 Mar. 812, 2009, Honolulu, Hawaii, U.S.A, pp. 1924-1929 (Year: 2009).*
Arusoaie et a., "Automating Abstract Syntax Tree construction for Context Free Grammars", published by IEEE, 2012 14th International Symposium on Symbolic and Numeric Algorithms for Scientific Computing, pp. 152-159 (Year: 2012).*

* cited by examiner

*Primary Examiner* — S. Sough
*Assistant Examiner* — Zheng Wei
(74) *Attorney, Agent, or Firm* — Mintz Levin Cohn Ferris Glovsky and Popeo, P.C.

(57) ABSTRACT

A method is provided that may include generating, based on a rule, an abstract syntax tree structure including a plurality of nodes, each of the plurality of nodes being associated with a portion of the rule; traversing a subset of the plurality of nodes and executing logic associated with each node of the subset; generating a plurality of execution events during the execution of the logic associated with each node of the subset; receiving a request to replay at least a part of the plurality of execution events; generating a user interface view to enable presentation of the rule as a plurality of nodes; and stepping through the plurality of execution events by selecting an execution event from the plurality of execution events and updating a presentation of a respective node identified by the selected execution event. Related systems, methods, and articles of manufacture are also disclosed.

14 Claims, 10 Drawing Sheets

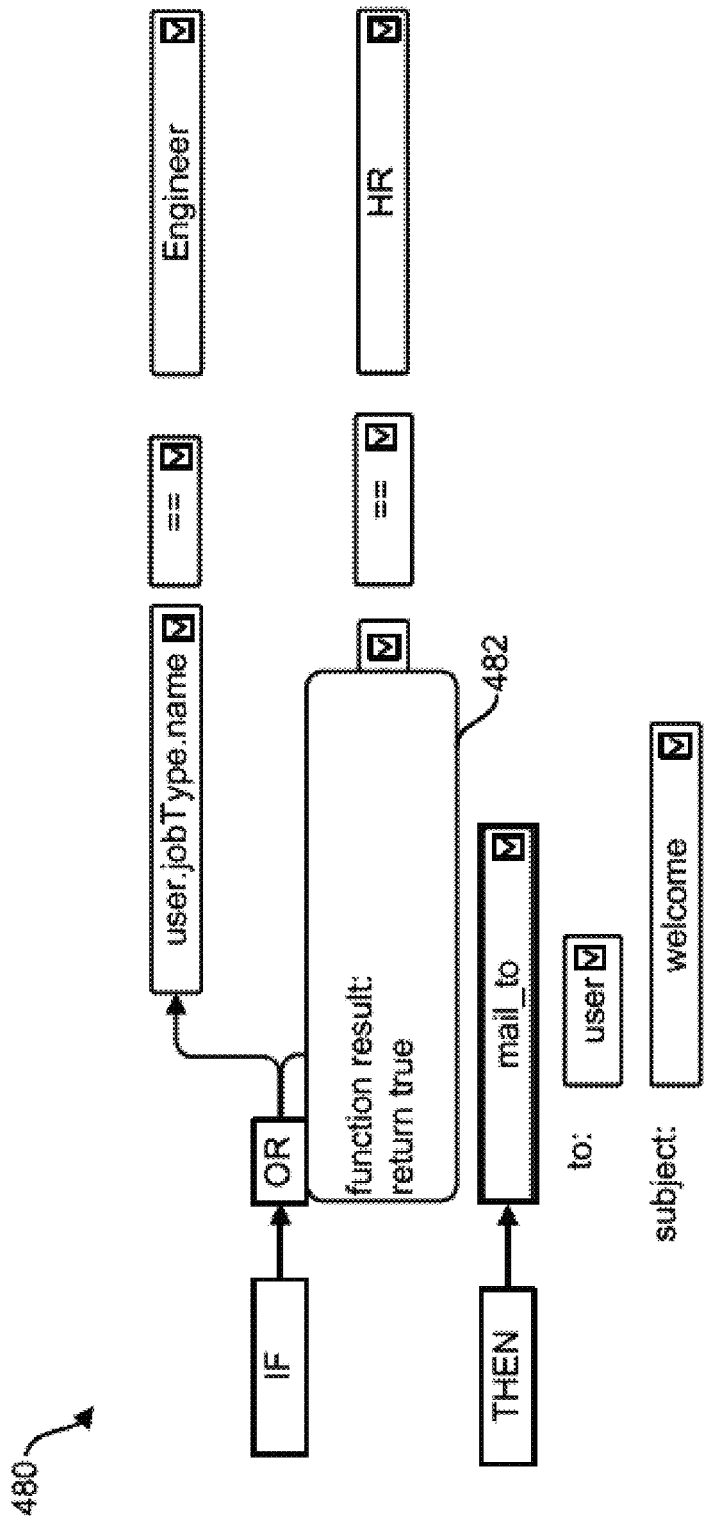

DEBUGGING RULES BASED ON EXECUTION EVENTS STORED IN AN EVENT LOG

TECHNICAL FIELD

The subject matter described herein relates generally to cloud computing and, more specifically, to debugging.

BACKGROUND

Many organizations utilize modern cloud-based applications to support multiple tenants (e.g., organizations, users, etc.). Each organization may customize the operating logic of an application based on its policies and requirements by designing and implementing rules such as pseudo code and the like. Each organization may update its rules as necessary to reflect any changes in its policies or requirements. Due to continuous changes in the environment, many organizations update their rules frequently.

SUMMARY

In some aspects, there is provided a method. The method may include generating a plurality of execution events associated with a debugging of an execution of a rule, each of the plurality of execution events generated based on an abstract syntax tree structure to enable identification of a node corresponding to a portion of the rule; storing the plurality of execution events in a database; receiving a request to replay at least a part of the plurality of execution events to enable the debugging of the execution of the rule; and generating a user interface view to enable presentation of at least a first execution event in the context of the abstract syntax tree structure to enable identification, on the user interface, of a first node corresponding to first execution event of the rule.

In some variations one or more of the following features can optionally be included in any feasible combination. The generating of the plurality of execution events may include loading a definition for the rule, parsing the rule, and translating the rule into the abstract syntax tree structure. The execution events may include entering a node, exiting a node, and state information related to the execution of the node. The state information may include whether an error occurred, a resolution of a value, and/or a resolution of a condition. The generated user interface view may include the rule presented as nodes, wherein the state information for each node is presented in the context of the corresponding node. The execution events may be stored in a pre-determined format and in accordance with the abstract syntax tree structure. The request to replay at least a part of the plurality of execution events may be received from a user interface. The request may trigger a replay component to perform the generating of the user interface view. The request may trigger the replay component to read the plurality of execution events and step through at least a portion of the plurality of execution events based on a user interface request. The generated user interface view may be presented to enable the debugging.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4C-FIG. 4E depict examples of user interfaces for debugging, in accordance with some example embodiments.

When practical, similar reference numbers denote similar structures, features, or elements.

DETAILED DESCRIPTION

As enterprises continue to grow, the rules used by the enterprise to customize applications including cloud-based applications and applications used in multi-tenant systems may become more complex. As such, rules customization including rule debugging may require more time and resources to discover and correct any errors that may be caused by a rule during execution. Therefore, there is a need to discover and resolve errors in rules.

Figure 1:
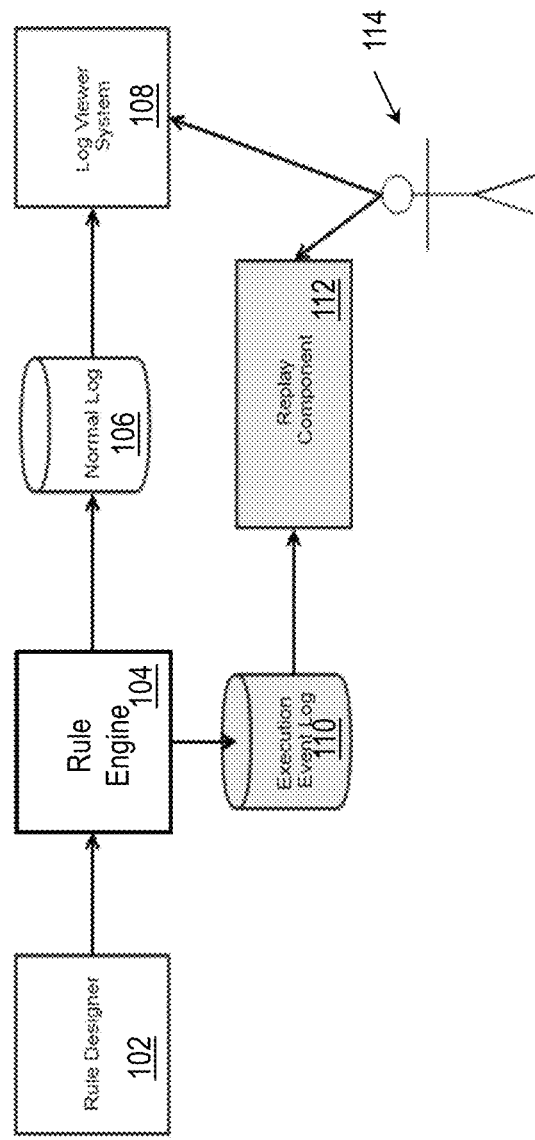
FIG. 1 illustrates a diagram of a system, in accordance with some example embodiments.

FIG. 1 illustrates a diagram of a debugger system 100, in accordance with some example embodiments. The system 100 may include a rule designer 102 configured to enable creation or design of one or more rules. The rule designer may include a user interface at which a rule and its components may be viewed as part of design and debugging.

The system 100 may also include a rule engine 104 configured to read a rule, translate the rule into a structure (e.g., an abstract syntax tree, AST), execute the rule, traverse the nodes of the AST (which correspond to the rule), and/or record in an execution event log 110 execution events (also referred to as events) associated with the execution of the rule.

The system 100 may also include a log database 106 (labeled normal log database) serving as a repository of alerts, errors, and the like, a log viewer system 108 configured to view log entries including entries at the log database 106 and view events at the execution event log database 110. The log viewer system 108 may include a user interface to, via the replay component 112, view events and/or view replayed execution events (stored at execution event log 110). The execution event log 110 may, in some example embodiments, store the events in a specific format to enable viewing or replaying at the replay component 112 and/or viewer system 108.

For example, the rule designer 102 may be used to develop and store one or more rules, which may be input into the rule engine 104 for processing. The rule engine 104 may convert a given rule into nodes of an AST and then traverse the nodes of the AST to step through the execution of the rule. During the traversal and execution, the rule engine may store one or more execution events relate to the traversal of the AST. These events may thus provide insight for debugging.

For example, as an AST node (which may correspond to a portion of a rule) is being entered for execution, the rule engine 104 may generate an execution event for the entry into the AST node (e.g., a node ID), and may store the event at execution event log 110. For the node being entered, the rule engine may also store other events related to the state of the AST node, such as the value of any variables, the resolution of any conditions (e.g., the value of an "OR" function), values of any variable returned by a function call, and/or any errors (e.g., exceptions) associated with the execution of the AST node. When the rule engine completes execution of the AST node, the rule engine may store an entry event to indicate exiting the AST node. If there is another AST associated with the rule, the rule engine may repeat the execution event logging for the other AST node. If there are no other AST nodes to be processed for the rule, the rule engine may stop as the execution and logging of the execution events for the rule is complete.

After the execution events are stored for the rule, the rule may be debugged by processing the event execution log including the execution events for the rule. Because the execution events are stored in the context of the AST for the rule, the execution events may be replayed (e.g., by the replay component 112) and/or presented (e.g., at a user interface) in a sequence that is consistent with the execution. For example, an execution event depicting an execution error may be shown at a user interface along with the rule's structure, such as the AST's structure. In this way, a user may be better able to debug the execution error.

As noted, the replay component 112 may process the execution events to enable detection of errors in the execution of the rule. For example, stepping through the execution events may indicate which node (or portion of a rule) caused an error. In some example embodiments, a user interface may present to a user the rule including its components, such as the AST nodes described further below. When this is the case, a user may graphically select at a user interface a portion of the rule (e.g., by selecting an AST node) and view execution event information for that portion (see, e.g., FIG. 4C-FIG. 4E as described further below). In this way, the execution event information at 110 is presented in the context of the rule. In particular, the execution event information is presented graphically in the context of the structure of the rule, such as the AST structure for the given rule. For example, the context of the rule may include presenting event execution information including state information, error information, variable resolution, and/or the like on, or adjacent to, the node mapped to the execution event information.

In some example embodiment, the rule engine 104 may, as noted, retrieve a rule and translate it into a given format, such as an abstract syntax tree (AST). As the rule engine traverses the AST nodes, the rule engine may, as noted, log at execution event log 110 events related to that execution. For example, the events may indicate when the rule engine enters a node, when the rule engine exits a node, resolution of (or an error when resolving) a variable associated with the node of the rule, function call information, condition evaluation result, and/or the like. The execution event log may thus provide information about each execution step performed by the rule (or a portion of the rule) to enable at least a viewing of the rule engine's replay of the rule.

In some example embodiment, the execution event log may store, in a specific format, the events related to the traversal of the AST nodes for a given rule. Thus, the events represent the steps associated with the execution of the rule.

The replay component 112 may, as noted, be used to view and/or analyze the execution event log. For example, the operator 114 may, via a user interface (e.g., log viewer 108 or other user interface) and/or the replay component 112, access the execution event log 110. The accessed execution event log may thus enable the replay component to replay all (or a portion of) the events corresponding to the execution of the rule.

In replaying the execution event log 110, the actual input and output points used in the execution of a rule may be stubbed (e.g., flagged with an indicator or ID to enable identification in the log 110), so that any errors in the events may be viewed and/or detected for further processing. The replaying of the events in the execution event log may include viewing, executing, viewing the state of variables, pausing the execution, viewing a result, controlling the steps of the execution, entering or exiting a node for a given rule, and/or the like. As noted, this replaying may be performed by the replay component but under the control of, or viewing at, a user interface accessible by the user 114, for example. Table 1 below shows examples of the execution events generated by the rule engine and logged at execution event log 104, so that the replay component can replay the events as part of debugging.

TABLE 1

| Action name | Syntax | Description | Actions by the replay component |
|---|---|---|---|
| enter | enter <label> | When rule engine enters a rule, or a condition expression or an action expression, which is a labeled node in the AST tree | highlight the position specified by the label |
| exit | exit <label> | When rule engine exits a rule, or a condition expression or an action expression, which is a labeled node in the AST tree | remove the highlight |
| resolve | resolve variable (=<value>)\|(raise <exception>) | When rule engine resolves a variable's value, or failed to resolve a value | change variable's value in the variable map |
| call | call function_name [return <value>\|raise <exception>] | When rule engine invokes a function, or failed to invoke a function | raise an exception |
| evaluate | evaluate result TRUE\|FALSE | When rule engine resolves the condition expression's return value | show the condition value |

As shown at Table 1, there may be two general two categories of execution events associated with an AST node of a given rule. The first category may indicate to the replay component 112 the location or position where the rule engine 104 was paused or stopped (e.g., location in a node, such as enter a node or exit a node) during execution of a portion (e.g., at an AST node) of the rule. The second category may indicate to the replay component 112 state information for the AST node. The state information may include the resolved value of a variable at an AST node or the failure (e.g., exception or error) to resolve the value, status of a function call (or whether the function call failed to be invoked), and/or an evaluation of a result such as a condition (e.g., or the exception or error for failing to resolve the condition).

Table 1 also depicts the action that the replay component 112 may perform for a given event. When debugging a rule for example, the replay component may highlight a node when it is the current node being viewed or processed as part of the debugging or remove highlighting when the debugging steps out of the node to another node. The replay engine may also show the value of a variable, raise exceptions (e.g., related to function calls), and/or show the value of a condition. Additional examples of the actions and evaluated results are discussed below with respect to FIG. 2, FIG. 3A, and FIG. 4C-FIG. 4E.

Figure 2:
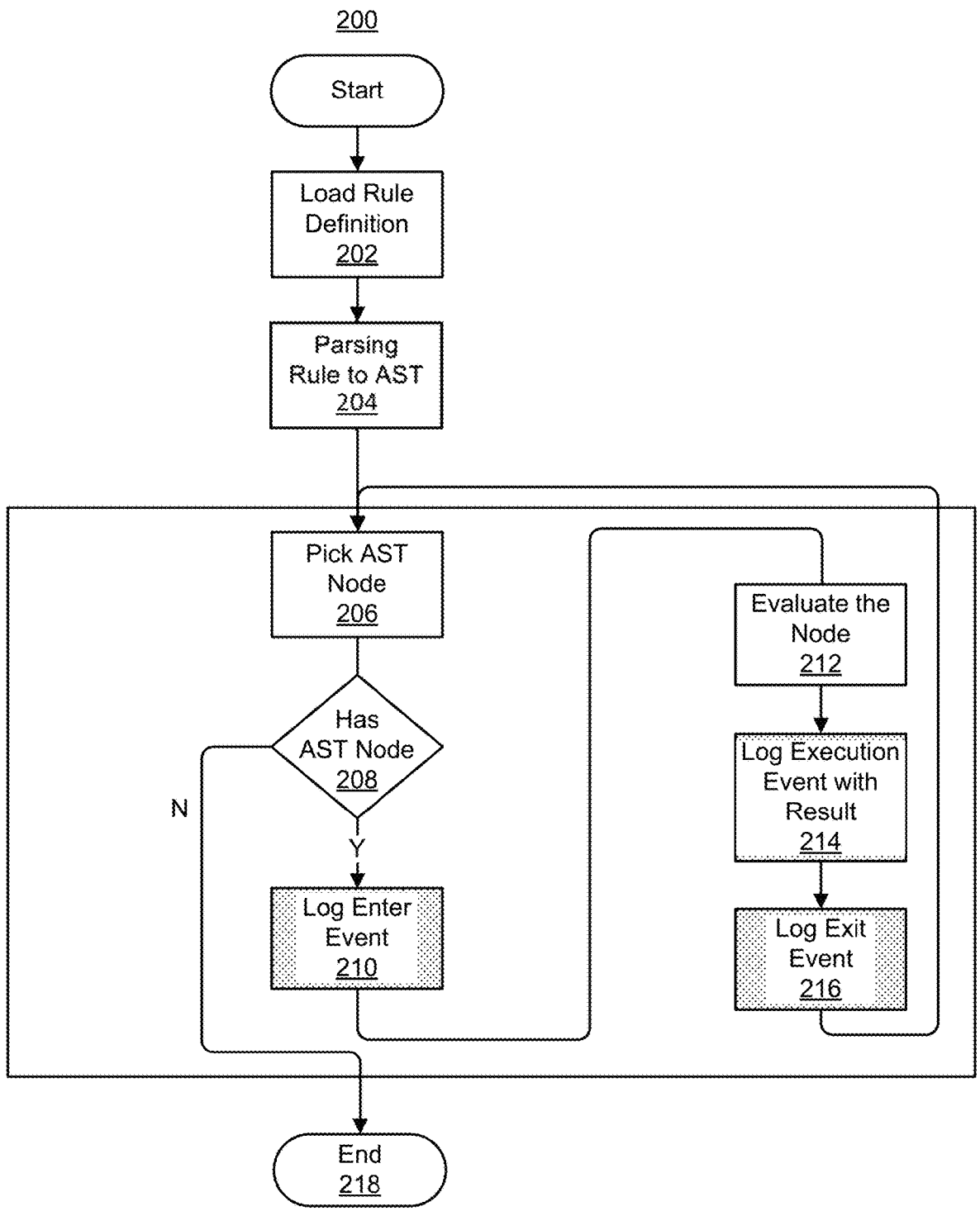
FIG. 2 illustrates a process flow for generating an execution event log, in accordance with some example embodiments.

FIG. 2 illustrates a process flow 200 for generating execution events for the execution event log 110, in accordance with some example embodiments. The description of FIG. 2 also refers to FIG. 1 and FIG. 3A.

At 202, the rule engine 104 may receive a rule. For example, the rule engine 104 may receive a rule from the rule designer 102 or some other repository of rules. For example, a rule may include statements which when executed invoke one or more operations, such as actions and/or the like, in an application. Table 2 includes an example of a rule. The example rule of Table 2 is referred to herein as Rule-1. In the example of Table 2, the rule is in the form of pseudo-code, although it may take other forms as well.

TABLE 2

IF user.jobType.Name == 'Engineer' or user.jobType.Name == 'HR'
THEN
    Mail_to(user, 'welcome')

Figure 3A:
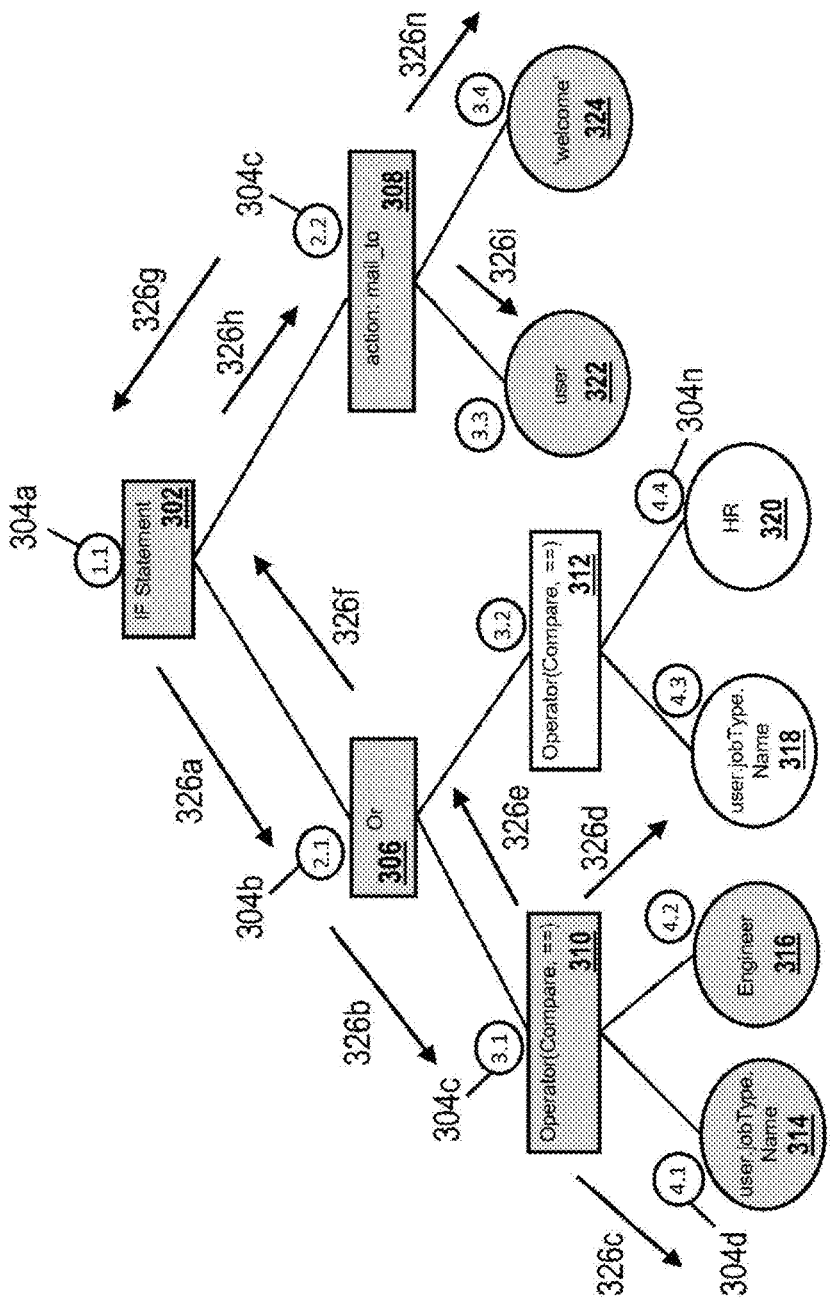
FIG. 3A and FIG. 3B illustrate examples of abstract syntax trees, in accordance with example embodiments.
Figure 3B:
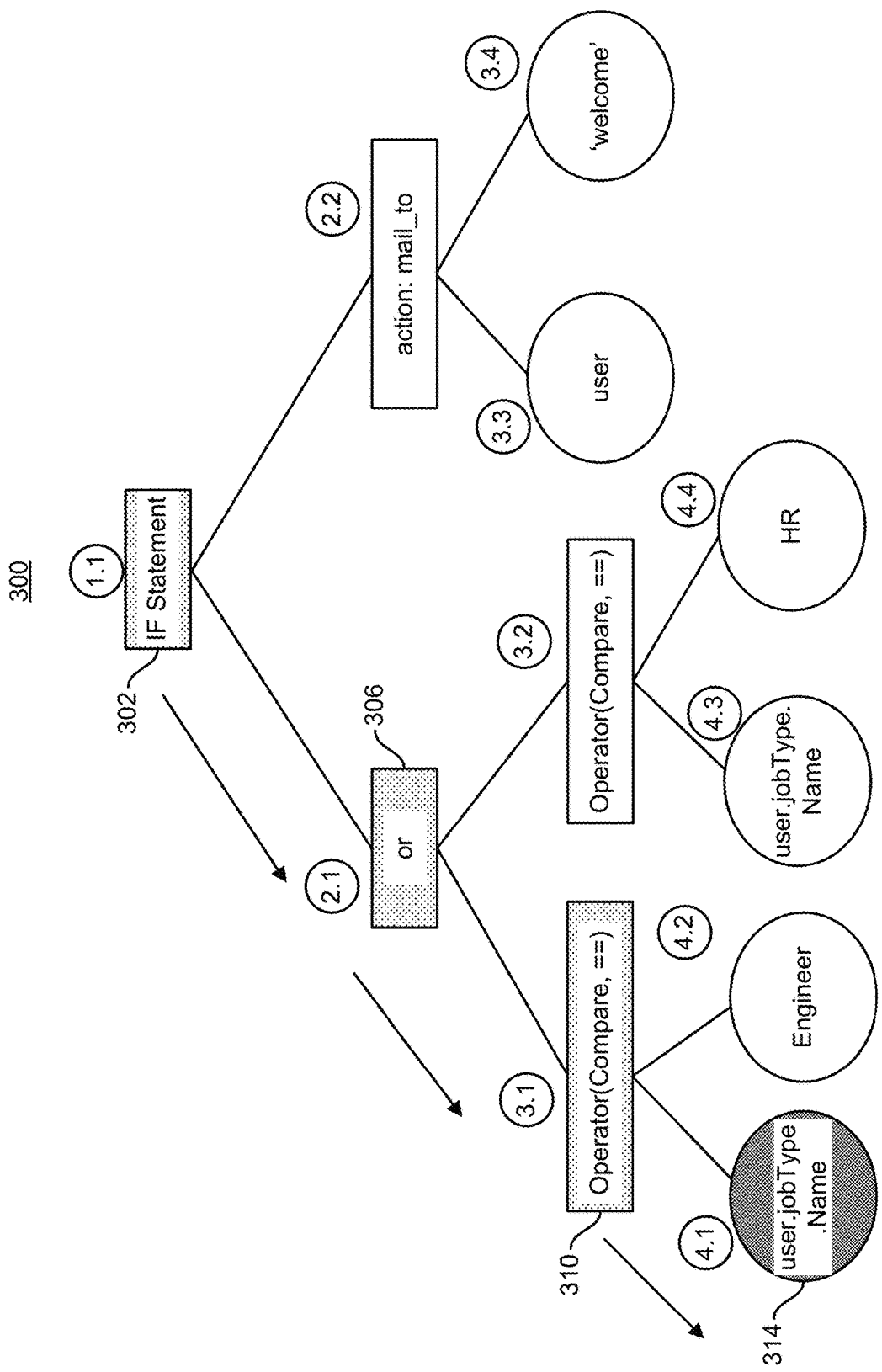

At 204, the rule engine 104 may parse the rule and then translate the rule into one or more nodes of an abstract syntax tree (AST). As noted, the portions of the rule may be translated into AST nodes. The AST nodes may thus represent the different portions of the rule. Moreover, the AST nodes may be used to process, such as interpret, the domain specific language of the rule. In the Rule-1 example, Rule-1 may be parsed to generate AST 300 illustrated at FIG. 3A-FIG. 3B. The nodes 302, 306, 308, 310, 312, 314, 316, 318, 320, 322, and 324 may include identifiers 304a-304n, which can be used to uniquely identify the nodes in the execution event log 110. FIG. 3A-FIG. 3B depict the same AST 300 for the rule at Table 2. The AST nodes 302, 306, 308, 310, 312, 314, 316, 318, 320, 322, and 324 also provide a logical structure so that when the execution events are replayed, the execution events including errors are processed and presented in the context of the AST.

At 206, the rule engine 104 may select a node to process. For example, during an initial pass, the rule engine may pick a root node in the AST 300 as a starting point for evaluating the AST 300 corresponding to the rule of Table 2. In the Rule-1 example, the "IF" statement is the root node statement corresponding to node 302 in the AST 300. The rule engine 104 may record in the execution event log 110 an entry event for node 302. For example, the entry event in the execution event log 110 may be "enter" with the unique identifier for node 302 (e.g., unique identifier "1.1"). In some implementations, a predetermined value may be used (e.g., "1.1" at 304a) to indicate to the rule engine 104 or replay component 112 that a node is a root node in the AST 300.

At 208, if there is another AST node to be processed, the rule engine 104 may enter the other node. When nodes are entered or exited, the rule engine may make corresponding execution event in the execution event log 110. While processing node 302 for example, the rule engine 104 may determine that there are at least two additional AST 300 nodes, such as node 306 (e.g., the logical function "OR") and node 308 (e.g., an action "Mail to"). If, at 208, it is determined that there are no additional nodes, then the process may end at 218.

If there is another node, the rule engine 104 may proceed, at 210, to that other node and log in execution event log 110 an event indicating that the rule engine 104 is starting to evaluate the other node. Returning to the Rule-1 example, the rule engine 104 may proceed to the node 306 and log in execution event log 110 an event "Enter 2.1" indicating that it has entered the node to evaluate the node.

At 212, the rule engine 104 may evaluate a current node being processed for execution to determine a node's value. Returning to the Rule-1 example, the rule engine 104 may evaluate node 306. In this example, node value may be evaluated as a logical "OR" function or the resolved value (or a resulting value or variable) of that OR function.

At 214, the rule engine 104 may log at the execution event log 110 an execution event and the resolved value of any local variables that may have been evaluated for the current node being processed. Returning to the Rule-1 example, the result of the evaluation of logical OR function in node 306 may be logged and may further indicate which node to proceed to.

At 216, the rule engine 140 may log at the execution event log 110 an execution event indicating that the rule engine 140 is exiting the node. Returning to the Rule-1 example, an event "Exit 2.1" may be logged in the execution event log 110, when the rule engine 104 is exiting node 306 as part of the execution of the node 306 (FIG. 3B).

The rule engine 104 may return to 206 and 208 after 216 to determine if there is another node in AST 300 to be evaluated. If there are no other nodes to process, the process may end ("No" at 208) causing the rule engine 104 to end AST node processing at 218. Otherwise, the rule engine 104 may continue the processes 206-216 until all nodes have been evaluated.

The rule engine 104 AST node processing at 200 may result in execution events being stored in the execution event log 110 for the AST (which corresponds to the rule). The stored execution events may thus enable the replay component 112 to replay the events to enable processing, such as presentation at a user interface and/or other debugging related processing.

In example of Rule-1 as shown at FIG. 3A, if "user.jobType.Name" is "Engineer," the rule engine 104 may traverse along the path segments 326a-326c to nodes 302, 306, 310, 314, and 316, where the execution events and the results at each node are recorded as execution event and stored at execution event log 110.

Table 3 below illustrates an example execution event log where the rule engine 104 may traverse along the path segments 326a-n shown at FIG. 3A to process all of the nodes 302, 306, 308, 310, 312, 314, 316, 318, 320, 322, and 324. At node 314 (which has an identity of 4.1, the execution event includes the resolution of the variable "Engineer" (see, e.g., line 5 at Table 3) followed by the exit of node 314.

TABLE 3

Event List 1

Begin
1) Enter 1.1
2) Enter 2.1
3) Enter 3.1
4) Enter 4.1
5)     Resolve user.jobType.name='Engineer'
6) Exit 4.1
7) Enter 4.2
8) Exit 4.2
9)     Evaluate result TRUE
10) Exit 3.1
11) Exit 2.1
12) Enter 2.2
13) Enter 3.3

TABLE 3-continued

Event List 1

14)     Resolve user=admin
15) Exit 3.3
16) Enter 3.4
17) Exit 3.4
18)     Call mail_to return TRUE
19) Exit 2.2
20) Exit 1.1
End The execution event log 110 may, as noted, store execution events, such as the events at Table 3, in the following format:

<execution log>::=<execution step> [<execution step>]*
<execution step>::=<action name> <action context>,
    although other formats may be used as well.

Table 4 illustrates an example log for node 4.1 including multiple resolution events associated with resolving variables.

TABLE 4

Enter 4.1
Resolve user = external representation of the user object
Resolve user.jobType = external representation of the user object
Resolve user.jobType.name= 'Engineer'
Exit 4.1

In some embodiments, the resolved value of a variable at a node may be of a primitive type and/or a struct object type. For a primitive type, the value may be directly logged in the execution event log 110. In case of a struct object type, the object may provide a string function or provide an external representation resolver, which may resolve the object to short string to uniquely refer to the object while providing an understandable representation to a user.

The AST 300 at FIG. 300 is similar to that of FIG. 3A, but FIG. 3B further illustrates an example evaluation of nodes 302, 306, 310, and 314. In the example in FIG. 3B, there is an exception (e.g., an error) at node 314 as the rule engine 104 was unable to resolve the "user.jobType.name" causing the rule engine 104 to pause or stop the execution at the node 314 (which has an identity of 4.1 on FIG. 3B and Table 5). For example, the error exception may be "DatabaseException" including a message stating "unable to create a connection," which may prompt the rule engine 104 to log to the execution event log 110 the execution event as shown at Table 5.

TABLE 5

Event List 2

Figure 4A:
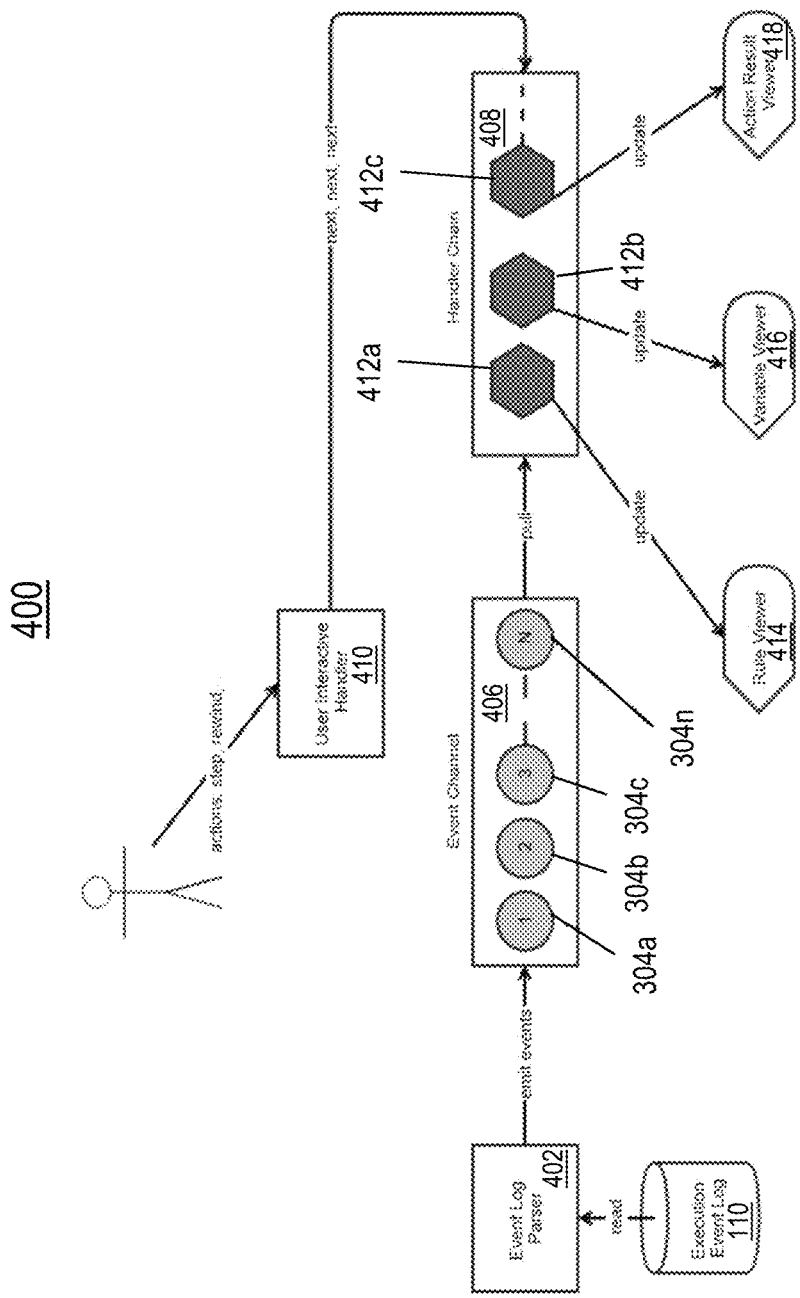
FIG. 4A and FIG. 4B illustrate examples of process flows for replaying execution event log, in accordance with example embodiments.

Begin
1) Enter 1.1
2) Enter 2.1
3) Enter 3.1
4) Enter 4.1
5) Resolve user.jobType.name='Engineer' raise exception DatabaseException "unable to create a connection"
End FIG. 4A illustrates an example of replaying execution events stored in the execution event log 110. The description of FIG. 4A also refers to FIG. 1, FIG. 3A, and FIG. 4C.

The execution event log parser 402 may load from the execution event log database 110 a log file including execution events. The event log parser 402 may then send the loaded execution events 1-N to an event channel 406. The execution events 1-N may correspond to the execution events logged at 110 with respect to the nodes 302, 306, 308, 310, 312, 314, 316, 318, 320, 322, and 324 of the AST 300, which in this example are identified by node IDs 304*a-n*. Referring to the execution events of Table 5 for example, event-1 may correspond to node 302 (e.g., node 1.1 304*a*), event-2 may correspond to node 306 (e.g., node 2.1 304*b*), event-3 may correspond to node 310 (e.g., node 3.1 304*c*) and so forth. The event log parser 402 may be included in the replay component 112, although it may be located at other components of system 100 as well.

The event channel 406 may interface with the handler chain 408. For example, the handler chain 408 may subscribe to events at the event channel 406, so the handler chain 408 can receive events such as events 1-N. The handler chain's 408 processing of the events may be trigger by a request from a user interface. For example, a user interface may provide a user interface element which when selected triggers the replay of the execution events. This user interface may also include a user interface element at which the execution events may be stepped through in the context of the AST. Referring to FIG. 4C, a user interface 470 may present the view shown including the AST nodes associated with the Rule 1 example. In this example, the user interface may include a user interface element, such as 466A, to trigger stepping through each node as part of the replay of the execution events. Alternatively or additionally, the user interface may present additional information at a given node (e.g., by selecting a node or selecting 466B). Examples of the additional information include, the resolution of a value, the resolution of a condition, an error/exception which paused execution, and/or the like. The event channel 406 and handler chain 408 may be included in the replay component 112, although it may be located at other components as well.

Each event 1-N at the handler chain 408 may be processed and evaluated by a specific handler 412*a*-412*n* for the event. For example, the handler chain may a rule viewer handler 412*a*, a variable viewer handler 412*b*, and an action result handler 412*c*. For example, the rule viewer handler 412*a* may control a cursor by placing it in a correct position at a user interface and update a rule viewer 414 to highlight a point at which the rule execution may be paused, for example, due to an exception. Referring again to FIG. 4C, when the replay component 112 processes events for node 314 where execution paused in the example of FIG. 3B, the rule viewer handler may highlight 472 the node as shown as part of the replay or debugging. If the user interface receives an indication (e.g., by a selection of 466*a*) to go to another node's execution event(s) such as the "OR" node, the rule viewer handler may remove highlight 472 and then highlight the "OR" node at FIG. 4C. The variable handler 412*b* may update a variable value or add a new resolved variable and update a variable viewer 416. The action handler 412*c* may determine that an action is being processed and update an action result viewer at 418. The replaying of the execution events log may continue until all events 1-N are evaluated.

Figure 4B:
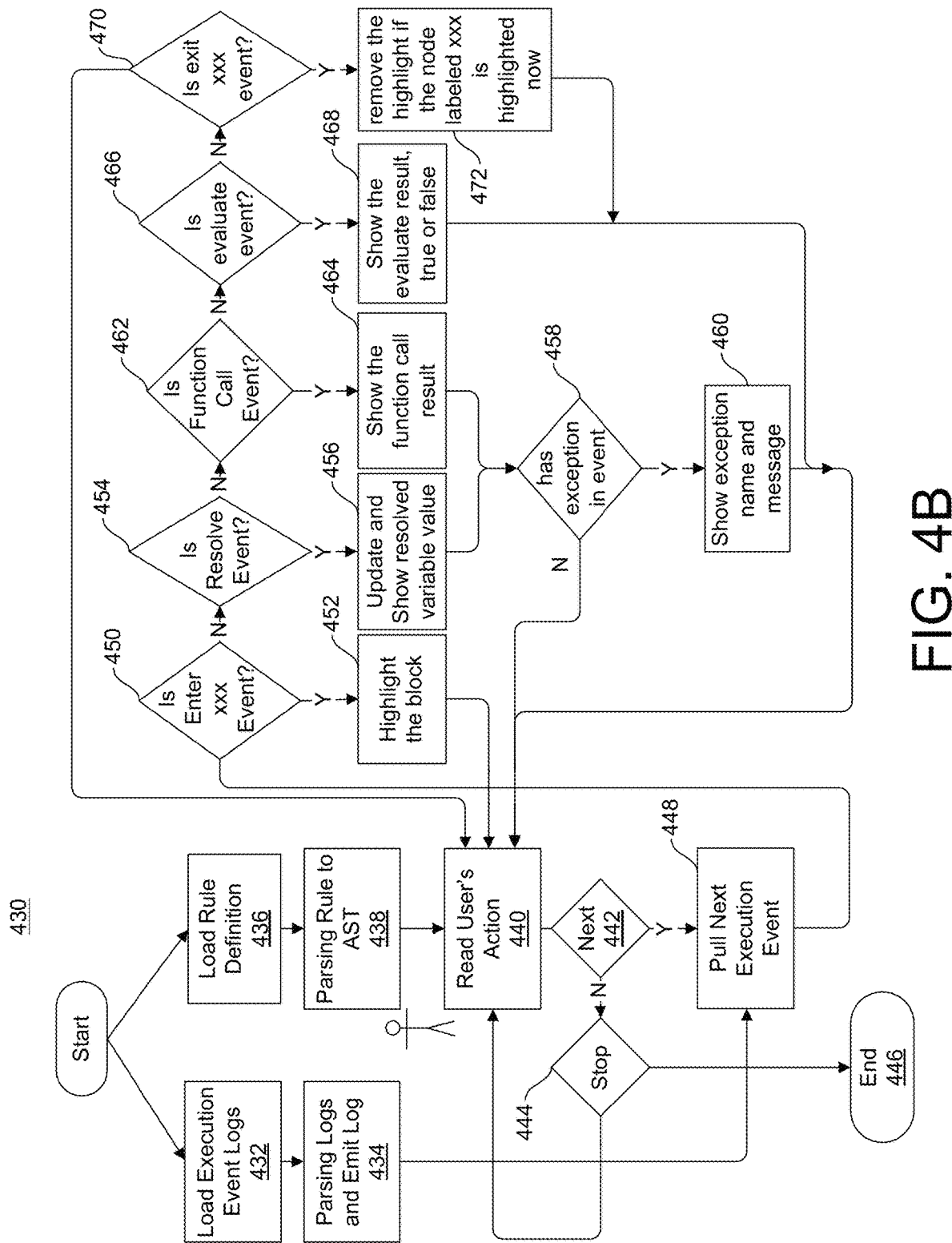
Figure 4C:
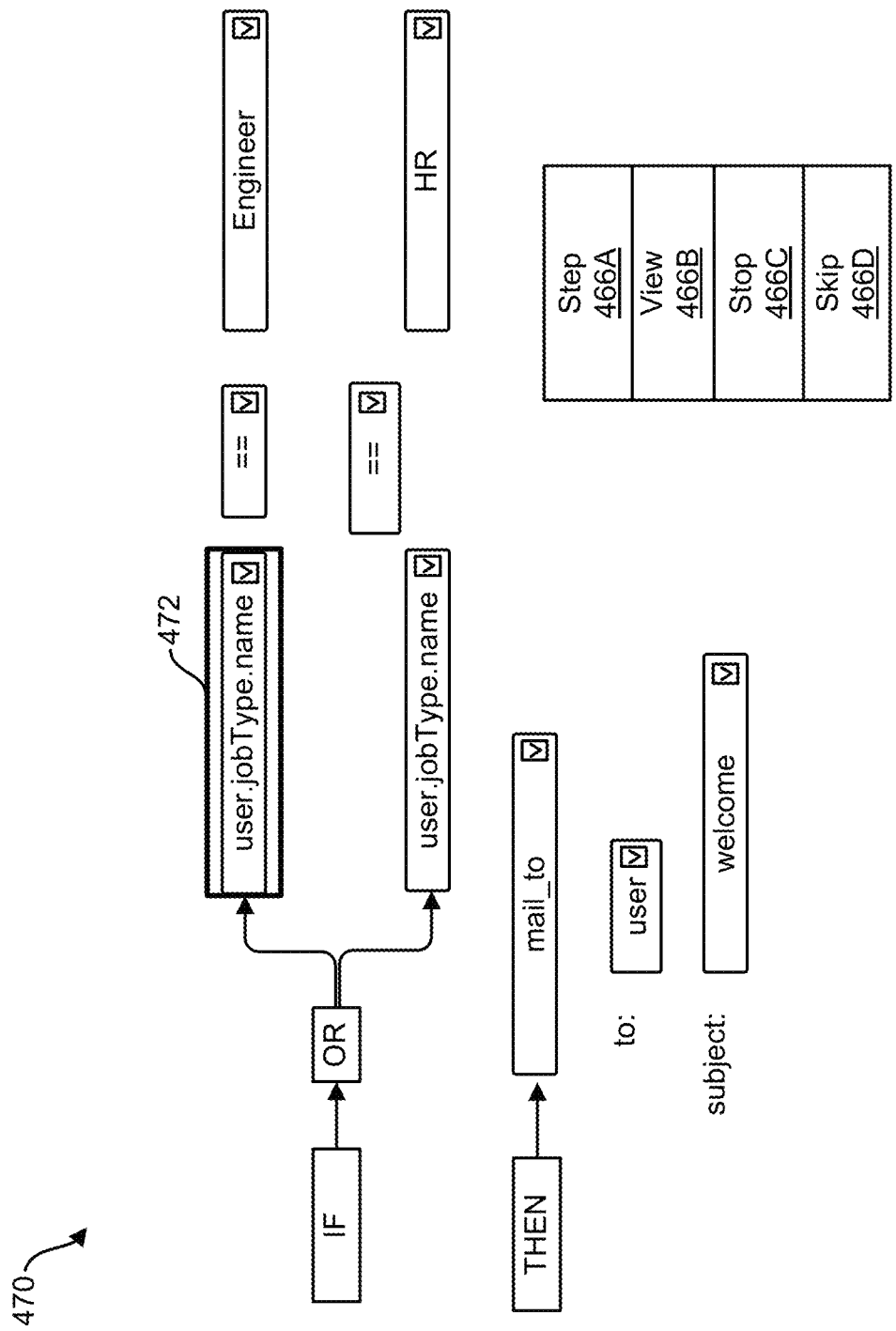

FIG. 4B illustrates a process for replaying execution events, in accordance with example embodiments. For example, a rule (or the corresponding AST nodes) may be presented at a user interface. To enable debugging the rule, the execution events may be loaded and processed. And as a user interacts with the user interface to step through the rule's AST nodes, the user interface may present information regarding the execution as obtained from the execution events at log 110. In this way, a user may step through the parts of a rule and see the state of the execution, such as node being entered, values associated with the node, function results associated with the node, any errors (e.g., exceptions raised during execution). As such, the execution event in the execution event log are processed and presented within the context of the rule and, in particular, the context of the rule structure, such as the AST.

Process flow 430 illustrates example processes for responding to control actions "next" and "stop" (e.g., 466A and 466C at FIG. 4C) for controlling a replaying of an execution event log. However, the system can provide additional control actions, for example, to skip (e.g., 466D) the replay process to a specific node or to stop the process when an exception is raised at a node.

At 432, the replay component 112 may load the execution events from the execution event log 110. And, an event parser 402 may, at 434, parse the events and emit the events as noted above with respect to 402 to an event channel 406, from which the handler chain 408 pulls events as noted above with respect to FIG. 4A to provide events for replaying.

At 436, the replay component 112 may load the rules, for example from a rule repository. This may be performed in the same or similar manner as described at 202. At 438, the replay component 112 may parse the rules to translate and generate an AST, such as the AST 300 in FIG. 3A and FIG. 3B. This may be performed in the same or similar manner as described at 204.

At 440, the replay component 112 may detect (e.g., read) an input at a user interface (e.g., a user interaction with a user interface element such as 466A-D) to start an action related to the events in the execution event log 110. The action may trigger the replay component to move to a node associated with an event, so the execution events for that node may include enter event, resolve event, function call event, evaluate event, exit event, and/or the like. For example, an event handler at 408 may get a node identifier, such as 1.1 304*a*, from the execution event log. As the node identifier is unique for the AST 300, the event handler may find the position in the structure of the AST 300 and related information, such as state information, structure of node, controls representing the node in the rule designer system.

Referring to FIG. 4B at 450-452, suppose in the Rule 1 example, the rule designer system displays via a user interface the rule as shown in FIG. 4C, when the event "Enter 4.1" is read in the Event list 1, the corresponding controls may be highlighted as at 472 FIG. 4C.

Referring again to FIG. 4B at 454 related to the resolve event handler, a map may be built with the key as a variable path through the AST nodes, and the value is the logged value of the execution event. During a replay, a variable map may be created to hold the resolved variables in event logs. This map be presented at a user interface. By visualizing this map of variables (associated with the node/rule) to user, the user may know the values of the variables during execution. At the very beginning, this map may be empty without any entries. When the event channel emits a "resolve" event (e.g., resolve <variable name>=<value>), the resolve event handle creates new entry in the map with the key being the <variable name> and the value being <value> of the event.

Referring again to the Rule 1 example and Event List 1 for example, when the execution event resolve user.jobType.name="Engineer" is read from the execution event, the following entry in the map is generated as shown at Table 5.

TABLE 5

| Name | Value |
| --- | --- |
| User.jobType.name | "Engineer" |

Suppose another resolve event is read such as resolve user.jobType.name="Engineer II" (which is not in Event List 1), the entry in the map with the new value may be updated so the result is as shown in Table 6.

TABLE 6

| Name | Value |
| --- | --- |
| User.jobType.name | "Engineer II" |

The information at Tables 5 and 6 may be shown at 454-456 via a user interface (see, e.g., FIG. 4C-4E) to a user as part resolution of an event including table control or the variable's value may be shown when hover over the controls related to the variable.

Figure 4E:
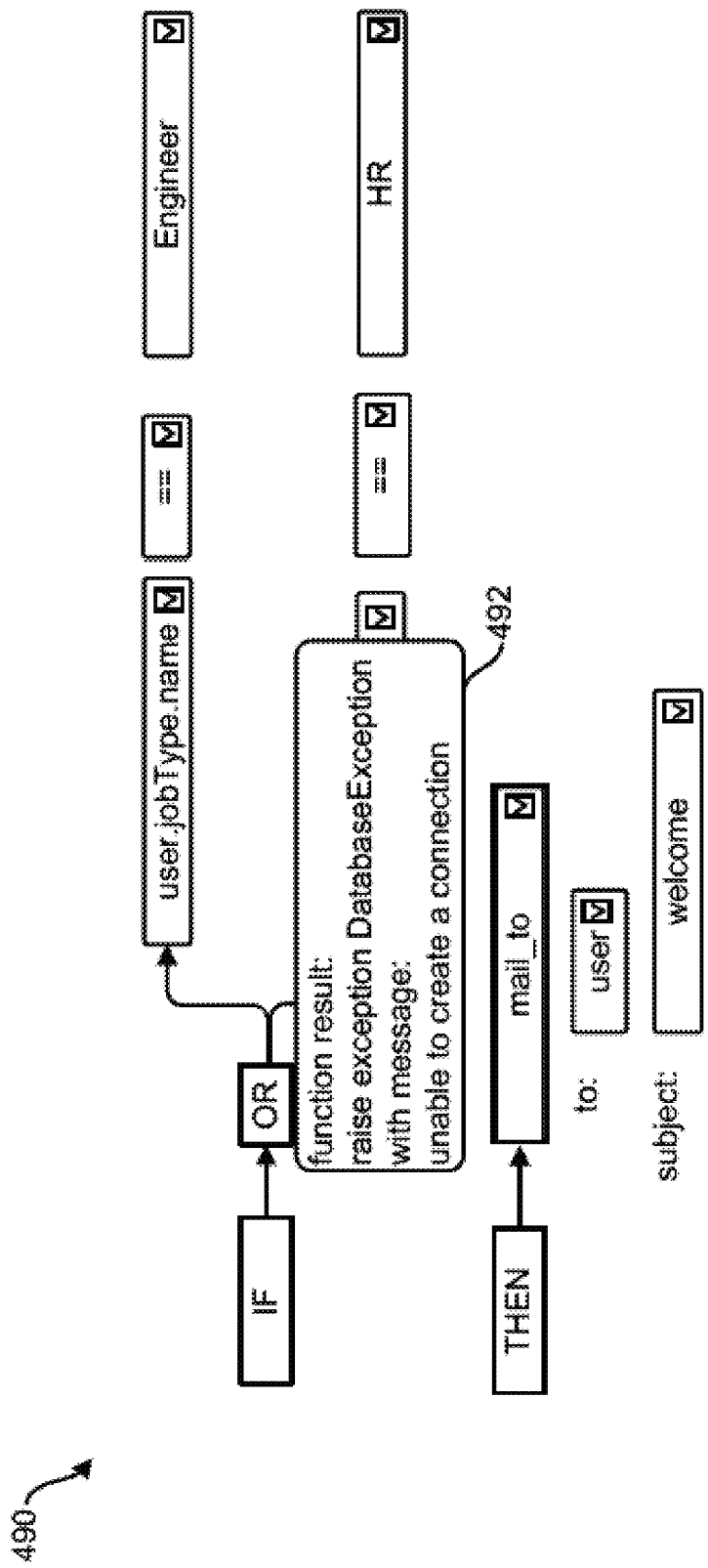

Regarding the function call event handling (462 at FIG. 4B), the function call result may be shown (464) at a user interface as well (e.g., over the controls representing the function call as shown at 482 at FIG. 4D. For example, the function result which is a normal result that is not in error. In contrast, FIG. 4E depicts an error, such as the "exception" shown at 492.

Regarding the evaluate event handler (466), this event handler may handle and show (468) events in the same or similar manner as described with respect to the function call event handler. Regarding the exit event handler (470), the exit event handler may handle exit events. While "Enter event" handler may highlight related controls to show entry into an execution event being displayer, the exit event handler (470) may remove (472) the highlighting related to the execution event to show the exit.

In another example of a "resolve" event such as "resolve user.jobType.name=Engineer II," where "Engineer II" is not in Event List 1, the map may be updated with the new value showing:

| Name | Value |
| --- | --- |
| User.jobType.name | "Engineer II" |

The updated table may be presented to the user through a table control or the variable's value may be shown when the user hovers a control indicator (e.g., mouse pointer) over the controls related to the variable.

In a function call event, the event handler 448 may show the function call result over the controls representing the function call. For example, in form 480 at FIG. 4E, the function result 482 is a normal result and may be shown at a user interface for the user. In the form 490 at FIG. 4E, the function result 492 may indicate a raised exception. The event handler 450 may handle an event designated to that handler with processes similar to the event handler 448. For an exit event, the event handler 452 may determine related controls and remove the highlight from those controls.

At 458, if there is no exception, the process may continue to 440 to determine a next action. If there is an exception, then the process may continue to 460. At 460, the exception name and a related message may be presented, and then the process may continue to 440 to determine a next action at 442 and pull 448 the next event in the log 110. If there are no events to process, the processing may end 444 and 446.

For example, if the event is a "Function call" (462), the function call result may be shown at 464. At 458, if there is no exception, the function call result may be presented over the controls representing the function call, which may be "normal or true" as shown at 482 in form 480 in FIG. 4D. Then, the process may continue to 440 to determine a next action. However, if there is an exception, the process may continue to 460 where the exception name and a related message such as "DatabaseException, unable to create a connection" may be presented as shown at 492 in form 490 in FIG. 4E. The process may continue to 440 to determine a next action. At 466, if the event is "evaluate," then the handler may show the evaluated result as true or false. For example, in FIG. 4E, form 480 presents the result as "true" in 482. At 470, for an exit event, the event handler may determine related controls and at 472, remove the highlight from those controls and return to 440 to determine a next action.

The replay component 112 may allow stepping through execution events for a rule and presenting the execution events in the context of the logical structure of rule, such as in the AST structure. In this way, the user interface may control the actions taken to process the execution events.

Figure 5:
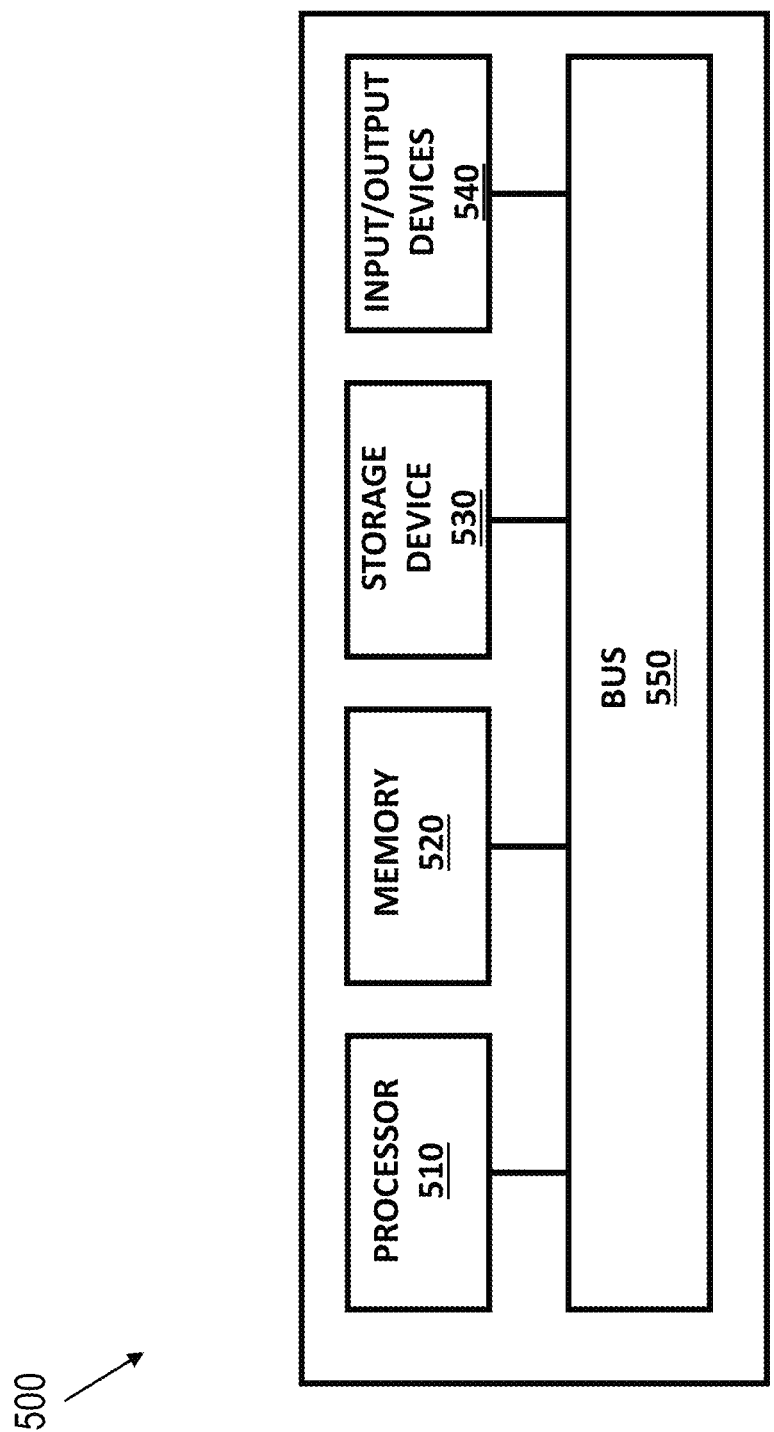
FIG. 5 depicts a block diagram illustrating a computing system consistent with some implementations of the current subject matter.

FIG. 5 depicts a block diagram illustrating a computing system 500 consistent with implementations of the current subject matter. The computing system 500 can be used to implement system 100 including the rule engine 104 and/or any components of system 100. Moreover, system 500 may be used to perform the operations disclosed herein described herein with respect to processes at FIG. 2, FIG. 4A, and FIG. 4B.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, rule engine 104. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    generating, based on a rule, an abstract syntax tree structure, the abstract syntax tree structure including a plurality of nodes, each of the plurality of nodes being associated with a portion of the rule;
    executing, by a rule engine of a debugger, the rule by traversing a subset of the plurality of nodes of the abstract syntax tree structure and executing logic associated with each node of the subset;

in response to the execution of the rule, generating, by the rule engine, a plurality of execution events associated with a debugging of the execution of the rule, each of the plurality of execution events being generated during the execution of the logic associated with a node of the subset, each of the plurality of execution events including a category indicator and a node identifier corresponding to a node of the plurality of nodes;

storing, by the rule engine, the plurality of execution events in a database;

in response to the execution of the rule, receiving, at a replay component of the debugger, a request to replay at least a part of the plurality of execution events to enable the debugging of the execution of the rule;

in response to the request being received, reading, by the replay component, the plurality of execution events from the database;

generating, by the replay component, a user interface view to enable presentation of the rule as a plurality of nodes of the abstract syntax tree structure; and in response to a user interface request, stepping, by the replay component, through at least the part of the plurality of execution events by at least obtaining an execution event from the plurality of execution events to produce a selected event, and updating, on the user interface view based on the node identifier and the category indicator included in the selected event, a presentation of a respective node of the plurality of nodes identified by the selected event.

2. The method of claim 1, wherein the generating the abstract syntax tree structure further includes loading a definition for the rule, parsing the rule, and translating the rule into the abstract syntax tree structure.

3. The method of claim 1, wherein the category indicator comprises entering the node, exiting the node, and/or state information related to the execution of the logic associated with the node, wherein updating the presentation of the respective node on the user interface view further comprises, in response to determining that the category indicator included in the selected event is for entering the node, highlighting the respective node, and wherein updating the presentation of the respective node on the user interface view further comprises, in response to determining that the category indicator included in the selected event is for exiting the node, removing the highlight for the respective node.

4. The method of claim 3, wherein the state information includes whether an error occurred, a resolution of a value, and/or a resolution of a condition, and wherein updating the presentation of the respective node on the user interface view further comprises displaying an error message associated with the error that occurred, displaying the resolution of the value, and/or displaying the resolution of the condition.

5. The method of claim 3, wherein the state information is presented on the user interface view in a context of the respective node.

6. The method of claim 1, wherein the execution events are stored in a predetermined format and in accordance with the abstract syntax tree structure.

7. The method of claim 1 further comprising:
presenting the generated user interface view to enable the debugging.

8. A system comprising:
at least one processor;
at least one memory including program code which when executed by the at least one processor causes operations comprising:

generating, based on a rule, an abstract syntax tree structure, the abstract syntax tree structure including a plurality of nodes, each of the plurality of nodes being associated with a portion of the rule;

executing, by a rule engine of a debugger, the rule by traversing a subset of the plurality of nodes of the abstract syntax tree structure and executing logic associated with each node of the subset;

in response to the execution of the rule, generating, by the rule engine, a plurality of execution events associated with a debugging of the execution of the rule, each of the plurality of execution events being generated during the execution of the logic associated with a node of the subset, each of the plurality of execution events including a category indicator and a node identifier corresponding to a node of the plurality of nodes;

storing, by the rule engine, the plurality of execution events in a database;

in response to the execution of the rule, receiving, at a replay component of the debugger, a request to replay at least a part of the plurality of execution events to enable the debugging of the execution of the rule;

in response to the request being received, reading, by the replay component, the plurality of execution events from the database;

generating, by the replay component, a user interface view to enable presentation of the rule as a plurality of nodes of the abstract syntax tree structure; and in response to a user interface request, stepping, by the replay component, through at least the part of the plurality of execution events by at least obtaining an execution event from the plurality of execution events to produce a selected event, and updating, on the user interface based on the node identifier and the category indicator included in the selected event, a presentation of a respective node of the plurality of nodes identified by the selected event.

9. The system of claim 8, wherein the generating the abstract syntax tree structure further includes loading a definition for the rule, parsing the rule, and translating the rule into the abstract syntax tree structure.

10. The system of claim 8, wherein the category indicator comprises entering the node, exiting the node, and/or state information related to the execution of the logic associated with the node, wherein updating the presentation of the respective node on the user interface view further comprises, in response to determining that the category indicator included in the selected event is for entering the node, highlighting the respective node, and wherein updating the presentation of the respective node on the user interface view further comprises, in response to determining that the category indicator included in the selected event is for exiting the node, removing the highlight for the respective node.

11. The system of claim 10, wherein the state information includes whether an error occurred, a resolution of a value, and/or a resolution of a condition, and wherein updating the presentation of the respective node on the user interface view further comprises displaying an error message associated with the error that occurred, displaying the resolution of the value, and/or displaying the resolution of the condition.

12. The system of claim 10, wherein the state information is presented on the user interface view in a context of the respective node.

13. The system of claim 8, wherein the execution events are stored in a predetermined format and in accordance with the abstract syntax tree structure.

14. A system comprising:
at least one processor;
at least one memory including program code which, when executed by the at least one processor, causes operations comprising:
generating, based on a rule, an abstract syntax tree structure, the abstract syntax tree structure including a plurality of nodes, each of the plurality of nodes being associated with a portion of the rule;
executing, by a rule engine of a debugger, the rule by traversing the plurality of nodes of the abstract syntax tree structure and executing logic associated with one or more nodes of the plurality of nodes;
in response to the execution of the rule, generating, by the rule engine, a plurality of execution events associated with a debugging of the execution of the rule, each of the plurality of execution events being generated during the execution of the logic associated with a node of the plurality of nodes, each of the plurality of execution events including a category indicator and a node identifier for a corresponding node of the plurality of nodes, the category indicator comprising an entering of the corresponding node, an exiting of the corresponding node, and/or state information related to the execution of the logic associated with the corresponding node;
storing, by the rule engine, the plurality of execution events in an execution event log to enable a replay for debugging;
in response to a request to replay the plurality of execution events stored in the execution event log, loading, from the execution event log, the plurality of execution events associated with the execution of the one or more nodes of the plurality of nodes and generating a user interface view including a plurality of user interface elements corresponding to the plurality of nodes of the abstract syntax tree structure, the user interface view further including a first user interface element which when selected at the user interface view steps to another execution event, a second user interface element which when selected at the user interface view presents additional information for a selected node, a third user interface element which when selected at the user interface view skips to a given node, and a fourth user interface element which when selected at the user interface view stops the replay;
in response to a selection of the first user interface element, receiving, from the user interface view, an indication to step from a first execution event representative of the plurality of execution events to a second execution event of the plurality of execution events and updating the user interface view to indicate selection of a node identified by the second execution event;
in response to the selection of the second user interface element, providing, to the user interface view, state information related to the execution of a second node identified by an execution event stored in the execution event log,
wherein in response to the additional information indicating an error message associated with the execution of the second node identified by the execution event stored in the execution event log, providing the error message for presentation, at the user interface view, and pausing the replay of the plurality of execution events, and
wherein in response to the additional information indicating a resolution of a value during the execution, providing for presentation, at the user interface view, the value;
in response to the selection of the third user interface element, skipping from the second execution event of the plurality of execution events to a third execution event of the plurality of execution events and updating the user interface view to indicate selection of a node identified by the third execution event; and
in response to the selection of the fourth user interface element, stopping the replay of the plurality of execution events.

\* \* \* \* \*